July 20, 1937.　　　G. P. PIGANEAU　　　2,087,579
BRAKING DEVICE
Filed Jan. 28, 1935　　　2 Sheets-Sheet 1
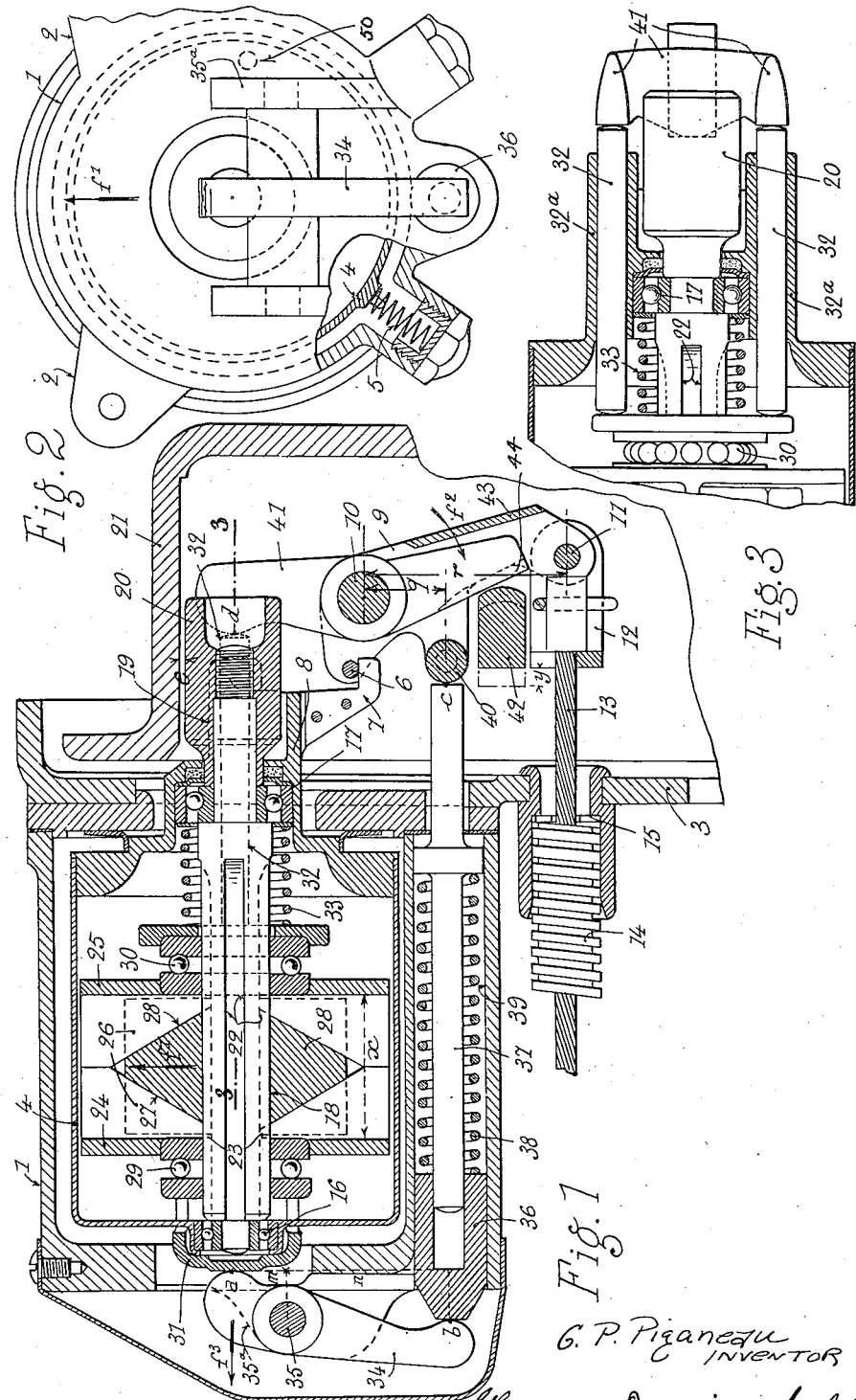

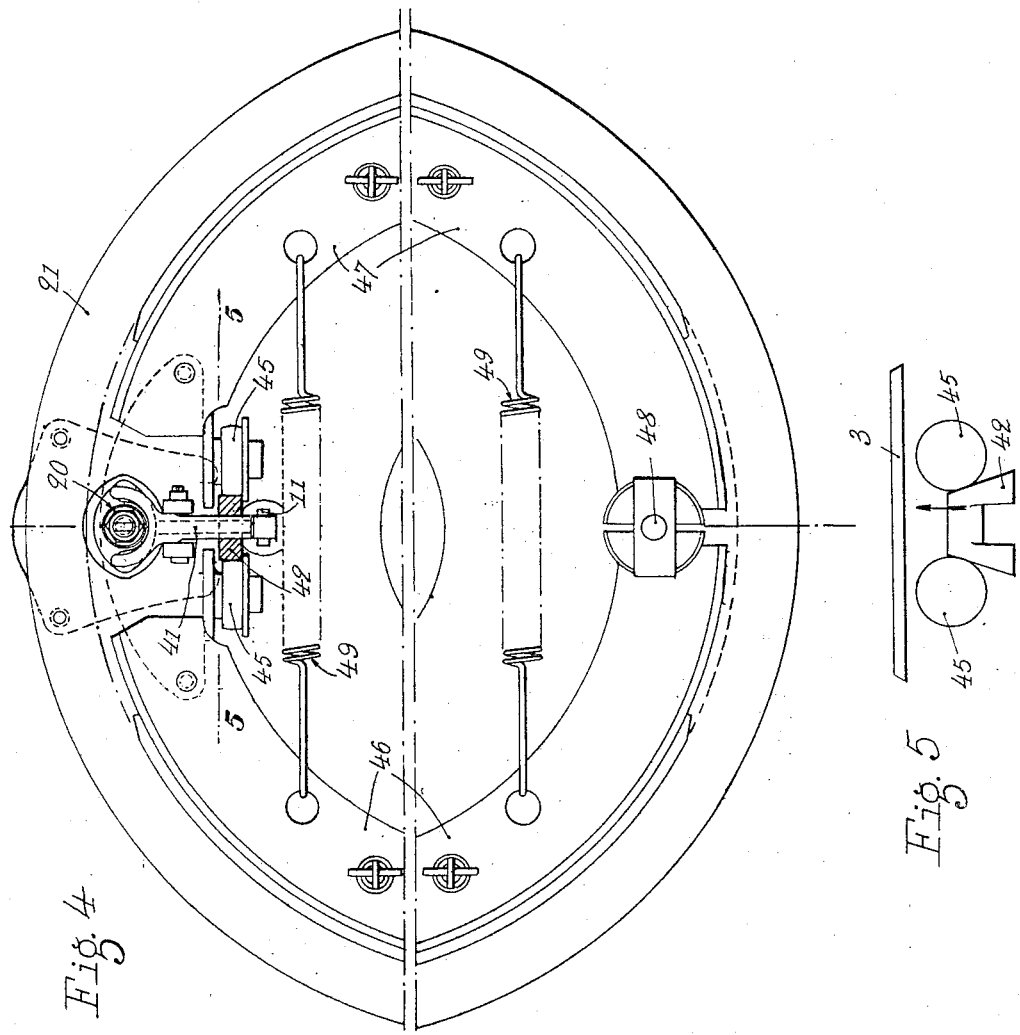

Patented July 20, 1937

2,087,579

UNITED STATES PATENT OFFICE 2,087,579

BRAKING DEVICE

Gérard Pierre Piganeau, Paris, France

Application January 28, 1935, Serial No. 3,843
In France January 29, 1934

5 Claims. (Cl. 188—140)

In the usual braking devices, the pedal or other controlling device must be displaced on a considerable inoperative stroke before the friction shoes are brought into contact with the drum. However, the total stroke of the pedal is necessarily limited by the adjacent parts, and thus after deducting from said total stroke the value of the forward inoperative stroke, the useful stroke available is limited; for this reason, it will not allow the use of a very great reduction ratio for the transmission device between said pedal and said shoes, as the total stroke of the braking parts would then be too small to compensate for the wear of the facings.

The present invention has for its object an improved braking device avoiding these drawbacks.

According to the invention, the pedal (or other controlling part) of the brake is connected with a servo-motor of the centrifugal or other type in such way that a very reduced displacement of said pedal from its idle position will cause the clutching engagement of the servo-motor, the movable expanding part of which acting upon the braking mechanism will take as a support, after it has instantly taken the play existing between the braking parts and the part to be braked, a movable member operated by the pedal with which it is connected.

From this it will result that by continuing to act upon the pedal after the clutching engagement of the servo-motor, the support of the expanding system of the servo-motor will be displaced and will thus modify its action upon the braking mechanism. Since the stroke of the pedal which is necessary to throw in the servo-motor is very small, practically the whole stroke of the pedal will be available in order to gradually vary the braking force. As this stroke is quite sufficient, it permits the use of a great stroke reduction ratio for the transmission device between the pedal and the expanding system of the servo-motor, and thus acts to set up a great effort against the reaction of said system, that is, to secure an energetic braking.

Further characteristics and advantages will be set forth in the following description.

In the accompanying drawings, which are given solely by way of example:

Fig. 1 is a view, in longitudinal section, of a servo-motor and of the operating device in the idle position.

Fig. 2 is a diagrammatic end view, the protecting casing being supposed to be removed.

Fig. 3 is a partial section on the line 3—3 of Fig. 1.

Fig. 4 is a view of braking shoes actuated by the device according to the invention.

Fig. 5 is a plan view on the line 5—5 of Fig. 4.

The servo-motor operating by centrifugal force, which may be of any known type, and chiefly one of the types described in applicant's prior patents, comprises a casing 1 which is secured by lugs 2 (Fig. 2) to a fixed support 3. In the said casing 1 is rotatable about eccentrically disposed studs 50 (Fig. 2) a cylinder 4, which is urged in the direction of the arrow $f^1$, by springs 5 (Fig. 2) in contact with the casing 1, as soon as said cylinder is released from a stud 6 in contact with a projection 7, forming part of an extension 8 of said cylinder 4. The stud 6 is mounted on a lever 9, pivoted on an axle 10 and connected at 11 with a forked bracket 12 to which is secured a cable 13 connecting said lever 9 with the brake pedal, not shown. The cable 13 is contained in a flexible sheath 14 which bears at 15 against the main frame 3.

In the cylinder 4 is centered, in ball-bearings 16—17, a shaft 18, and upon an extended part 19 of the latter, is secured, by screws, by key or the like, a roller 20, adapted to bear against the inner surface of the drum 21 of the wheel. The diameter of said roller 20 and the positions of the different parts are such that in the idle position, when the stud 6 bears upon the projection 7, the roller 20 will be at a very short distance $e$ from the drum 21.

Upon the shaft 18 is mounted any suitable device which will expand by the action of centrifugal force.

In the example represented, the shaft 18 is grooved, and in the grooves 22 are located studs 23 pertaining to discs 24—25 which are set in rotation by the shaft 18 when this latter is rotated by the roller 20 in contact with the drum 21. The faces of the discs 24—25 facing each other are provided with wings 26 located in radial grooves 27 of heavy pieces 28. The inner edges of the wings 26 in contact with the bottom of the grooves 27 of the heavy pieces 28 are inclined with reference to the shaft 18, and thus when the pieces 28 become separated from the shaft 18, by centrifugal force, they cause the discs 24 and 25 to be moved further apart from each other. These discs bear, for instance by means of thrust ball-bearings 29—30, respectively against a thrust member 31, and against two push-pieces 32 (Figs. 1 and 3) slidable in bored projections 32$^a$ separately secured to or cast in one with the end of the cylinder 4. A spring 33 tends to bring together the members 24—25—28 when the centrifugal force ceases to act upon the heavy pieces 28.

In fact, the action of the expanding system which is subjected to the centrifugal force, whether it be of the type above described or any other, will be manifested, when the system is set in rotation, by a variation of the length $x$.

According to the invention, the thrust member 31 bears against one arm of a lever 34 pivoted on an axle 35 mounted in bosses 35$^a$ forming part of the casing 1. The other arm of said lever is in contact with an elastic push-piece consisting of two parts 36 and 37 which are urged apart by a spring 38. The push-piece 36—37 is contained in a bore 39 in the stationary casing 3. Its rear end is maintained by the spring 38 in contact with a projection 40 pertaining to the lever 9 above mentioned.

The device is completed by a lever 41 pivoted to the same axle 10 as the lever 9. Its upper end, which has the form of a fork, is adjacent the push-pieces 32 (Figs. 1-3) of the expanding device, and its other end 44 is adapted to act, when it moves in the direction of the arrow $f^2$, upon a controlling member of the braking mechanism for instance upon a wedge-shaped cam 42 engaged between rollers 45 carried by the adjacent ends of two friction shoes 46, 47 (Figs. 4 and 5) which are pivoted at their other ends to a common fixed axle 48, said friction shoes being urged together by one or more reaction springs 49.

The operation is as follows. On pressing down the pedal of the brake, the cable 13 turns the lever 9 in the direction of the arrow $f^2$, the stud 6 moves upwards, but without losing contact with the projection 7, the cylinder 4 being pushed in the direction of the arrow $f^1$ by the springs 5 (Fig. 2). At the end of a very short stroke, the play $e$ between the roller 20 and the drum 21 being small, the said roller 20 is in contact with said drum 21 and will be set in rotation by the latter. Immediately, the heavy pieces 28 will move apart, thus increasing the length of the expanding system. As the thrust member 31 bears at $a$ against the lever 34, which is held in place at $b$ by the push-piece 36—37 in contact at $c$ with the lever 9, the push-pieces 32 will turn the lever 41, thus moving the member 42 and hence causing the pressure of the friction shoes 46, 47 against the brake drum 21. The relatively long stroke $y$ for the approach is effected almost instantly, as the servo-motor has only to overcome the return resistance of the friction shoes. As will be observed, during the whole of this stroke $y$ for the approach, the servo-motor alone has acted; the lever 9 has remained stationary, and it would even have a tendency to bring the pedal of the brake to the rear by reason of the thrust, at $a$, of the thrust member 31, in the direction of the arrow $f^3$, upon the lever 34, if the driver did not maintain the pedal of the brake in the position in which the coupling of the servo-motor took place.

If after the ineffective stroke $y$ which is taken up by the expanding system, the brake pedal should be held in the fixed position, and if the torque about the axis 35 of the reaction exerted at $a$ by the thrust member 31 upon the lever 34 is greater than the torque, about the same axis, due to the resistance of the spring 38, this spring will yield, and the system will assume another position of equilibrium, which corresponds to a determined pressure P of the push-pieces 32 upon the lever 41 and hence upon the brakes, and to a thrust $p$ of the pedal under the driver's foot. The ratio between the pressures P and $p$ will depend upon the ratio of transmission between the pedal and the push-pieces 32, and this ratio may be very great. It may for instance be equal to thirty; in fact, the lever arm $m$ of the lever 34 is for example one-third of the lever arm $n$ of this lever, and in like manner, the lever arm $q$ of the lever 9 has about one-half the value of the arm $r$ of this lever, and this will give a transmission ratio equal to $3 \times 2 = 6$ for the mechanism properly so called. As the ratio of transmission of the pedal is usually equal to 5, the total will thus be $3 \times 2 \times 5 = 30$.

Thus, for a force $p$ upon the pedal, the driver will bring upon the brake a force P equal to $30p$.

When the driver presses down the pedal, the spring 38 will be compressed, thus giving another position of equilibrium, the new force P' being always equal to $30p'$.

As the initial stroke of the pedal, corresponding to the clutching engagement of the servo-motor, is very short, and consequently as the pedal has practically no ineffective stroke, it will be observed that it is possible to obtain a series of braking forces P which is quite extensive.

When the driver ceases to press down the pedal, this latter will return by the effect of the reaction spring, the stud 6 presses upon the projection 7 due to the action of the spring 38 and thus releases the expanding mechanism, whilst the lever 34 will resume its idle position under the action of the spring 33.

In order to avoid the skidding of the wheels, the device is so designed that the maximum displacement of the expanding system towards the lever 41 due only to the action of the driver upon the pedal and consequently upon the lever 34 is shorter than the difference between the lengths of said expanding system when in extended and contracted positions, said difference corresponding to the stroke $y$ of the member 42 for bringing the shoes 46, 47 into contact with the drum 21. Due to this arrangement, if the wheel should tend to skid by an excess of braking, the distance $x$ will be at once reduced and the expanding system being no longer rotated will assume its contracted position and its minimum length. Even if the driver presses in this case the pedal down completely, the lever 34 will impart to the expanding system a displacement towards the lever 41 which will be insufficient to bring the shoes 46, 47 into contact with the drum 21. It appears thus that any tendency of skidding of the wheels due to the braking action will be automatically eliminated.

Again, for the braking at slow speeds, which are not sufficient to allow the servo-motor to expand under centrifugal force, the lever 9, which is directly connected with the pedal, permits of exerting a braking action, due to a flange 43 which, after an ineffective stroke sufficient to allow the automatic operation aforesaid, makes contact with the lever 41 and turns it in the direction of the arrow $f^2$.

As will be observed, the mechanism herein described comprising a closed and jointed circuit $c\ b\ a\ d$, in which only the length $a\ d$ is variable and extensible, permits of exerting a direct action by the brake pedal, and the servo-motor is now only used as an intermediary for taking up the play, so that the whole stroke of the pedal is available for an effective braking action, and hence, for a given stroke of the pedal, it is possible to obtain a greater stroke reduction ratio for the transmission and hence a greater braking force for a given force on the pedal.

Obviously, the invention is not limited to the method of execution represented and described, which is given solely by way of example.

Having now described my invention what I claim as new and desire to secure by Letters Patent is:

1. In combination a rotary member adapted to be braked, friction means adapted to be engaged with and disengaged from said rotary member, controlling means adapted to bring said friction means against said rotary member and to press said friction means against said rotary member with an increasing force, extensible and contractible means, operating means adapted to be moved on a stroke of a determined length, thrust means adapted to bear on one end of said extensible and contractible means and operatively connected with said operating means, whereby said operating means is adapted to move said extensible and contractible means endwise during its whole stroke, restraining means adapted to normally maintain said extensible and contractible means in its contracted position, motive means adapted to bring said extensible and contractible means in its extended position, transmission means provided between the other end of said extensible and contractible means and said controlling means and adapted to bring said friction means against said rotary member when said extensible and contractible means is brought in its extended position, and releasing means operatively connected with said operating means and adapted to release said restraining means and to make said motive means operative during the first and smaller part of said stroke, whereby said friction means are brought against said rotary member during said first part of said stroke and are pressed against said rotary member with an increasing force during the second and greater part of said stroke.

2. In a combination according to claim 1, the further feature consisting in stroke reducing means inserted between said operating means and said thrust means.

3. In a combination according to claim 1, the further feature consisting in yielding means inserted between said operating means and said thrust means.

4. In a combination according to claim 1, the further feature consisting in stroke reducing means inserted between said operating means and said thrust means and adapted to impart to said extensible and contractible means during the whole stroke of said operating means a displacement shorter than the difference between the lengths of said extensible and contractible means when in extended and contracted positions.

5. In combination a rotary member adapted to be braked, friction means adapted to be engaged with and disengaged from said rotary member, controlling means adapted to bring said friction means against said rotary member and to press said friction means against said rotary member with an increasing force, a rotatable shaft, guiding means adapted to guide said shaft towards and away from said rotary member, clutching means between said rotatable shaft and said rotary member, whereby said shaft is adapted to be rotated by said rotary member when said shaft has been moved towards said rotary member, extensible and contractible centrifugal means adapted to be rotated by said shaft, operating means adapted to be moved on a stroke of a determined length, thrust means adapted to bear on one end of said extensible and contractible means and operatively connected with said operating means, whereby said operating means is adapted to move said extensible and contractible means endwise during its whole stroke, restraining means adapted to normally maintain said extensible and contractible means in its contracted position, transmission means provided between the other end of said extensible and contractible means and said controlling means and adapted to bring said friction means against said rotary member when said extensible and contractible means is brought in its extended position, and releasing means operatively connected with said operating means and adapted to release said restraining means and to cause said clutching means to be brought in operative position during the first and smaller part of said stroke, whereby said friction means are brought against said rotary member during said first part of said stroke and are pressed against said rotary member with an increasing force during the second and greater part of said stroke.

GÉRARD PIERRE PIGANEAU.